Feb. 23, 1943.    R. F. SMITH    2,312,005
RETRACTIBLE HEADLAMP
Filed Aug. 2, 1940    2 Sheets-Sheet 1

Inventor
Robert F. Smith
By Blackmore, Spencer & Flint
Attorneys

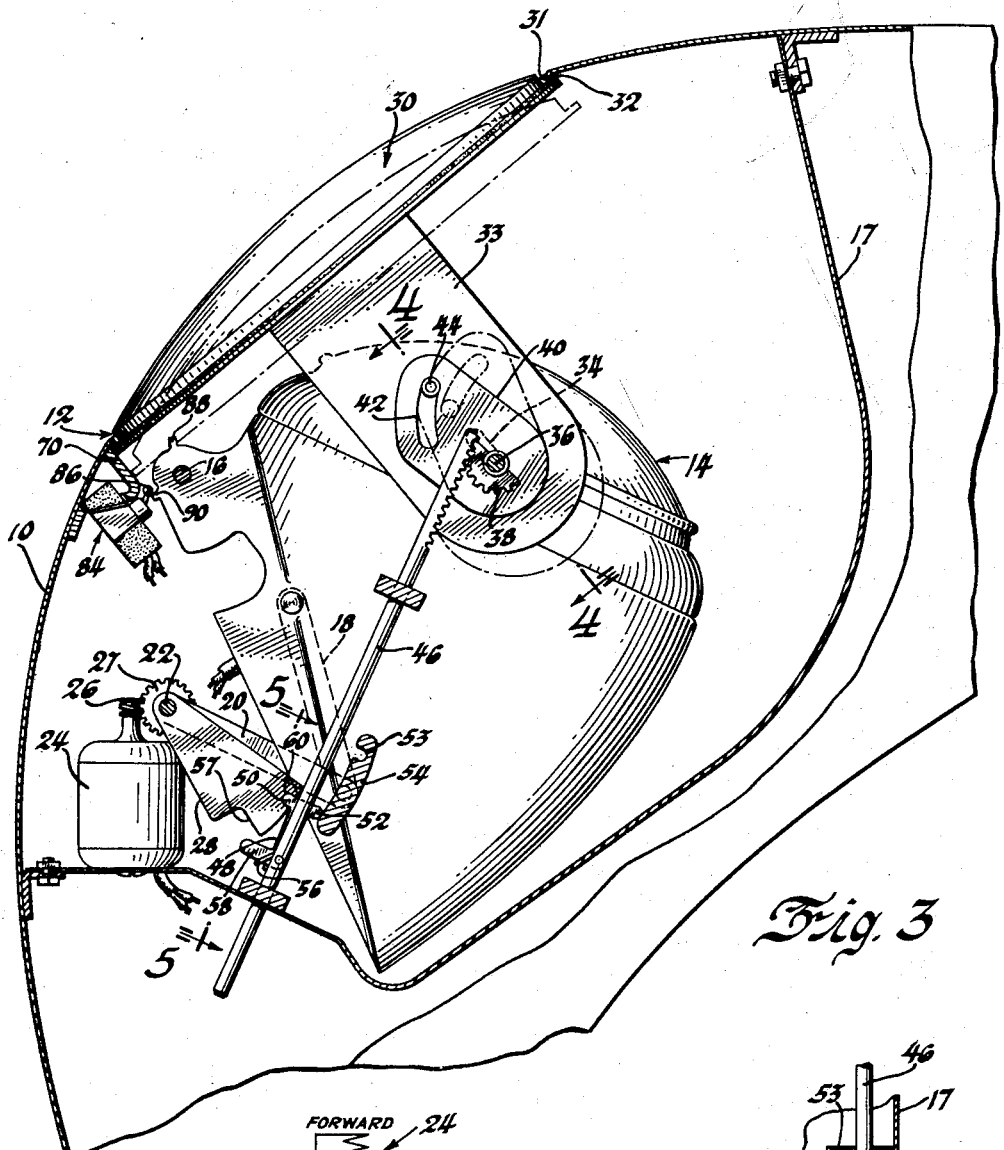
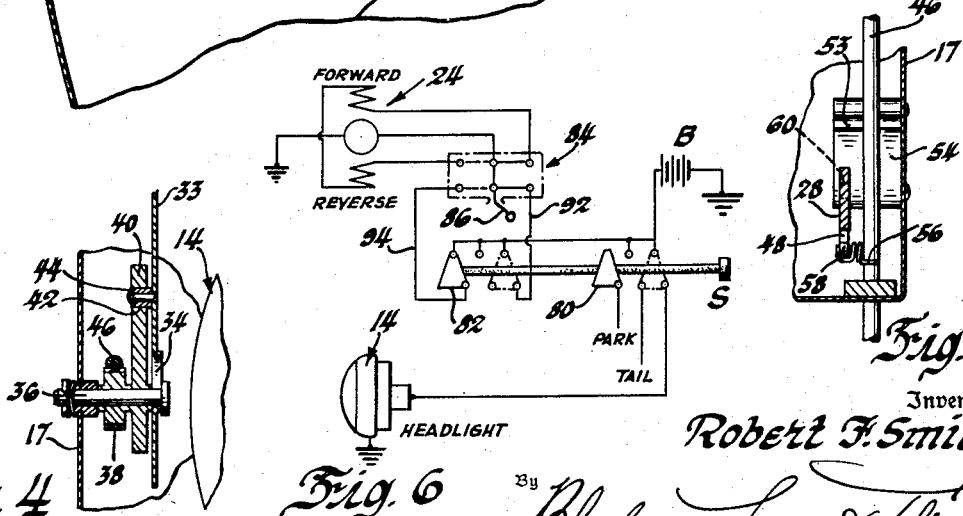

Patented Feb. 23, 1943

2,312,005

UNITED STATES PATENT OFFICE 2,312,005

RETRACTABLE HEAD LAMP

Robert F. Smith, Detroit, Mich., assignor to General Motors Corporation, Detroit, Mich., a corporation of Delaware Application August 2, 1940, Serial No. 349,473

11 Claims. (Cl. 240—7.1)

This invention has to do with a retractable mounting for lamps such as automobile headlamps so that they may be concealed in a fender, hood, or other part of the body of an automobile and when desired may be moved outwardly into operative position.

According to the invention the fender or other body part is provided with a suitable opening and the lamp is mounted on a pivot so arranged as to permit the lamp to be swung outwardly through the opening into operative position. A cover is provided for the opening and means is provided to retract the cover prior to the outward movement of the lamp and to move the cover to closed position after the lamp has been retracted. The invention provides a common operating means for moving the cover and the lamp in the desired sequence.

A feature of the invention consists in the provision of means to move the lamp cover forward into tight sealing engagement with the fender opening toward the end of the lamp retracting cycle to provide a good seal.

Another important feature consists in the provision of means for locking the lamp cover in either forward or retracted position thereby insuring the parts against rattling.

Other objects and advantages will be pointed out in the course of the following description taken in connection with the accompanying drawings, in which:

Figure 3 is a view similar to Figure 2 but showing the lamp in retracted position.

Figure 4 is a fragmentary section on line 4—4 of Figure 3.

Figure 5 is a fragmentary section on line 5—5 of Figure 3.

Figure 6 is a diagrammatic view showing a circuit which may be used.

Figure 1:
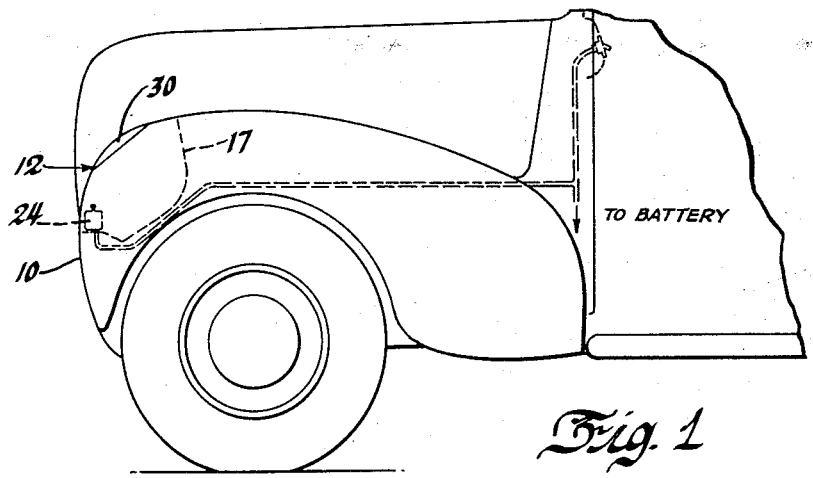
Figure 1 is a side elevation of the front portion of an automobile equipped with the invention.

10 indicates a portion of an automobile body, for example, a portion of an automobile fender having an opening 12 therein of sufficient size to permit the partial projection of the headlamp 14. Lamp 14 is pivotally mounted at 16 on a pivot suitably secured in the fender or any suitable support such as housing 17 secured to the underside of the fender and housing the lamp operating mechanism.

To each side of the lamp housing is pivoted a link 18 which in turn is pivoted to a lever 20 secured to operating shaft 22 which may be rotated by any suitable means, such as an electric motor 24, through worm gear 26 and worm wheel 27.

It is obvious that rotation of the shaft 22 in counterclockwise direction will rotate levers 20 and through links 18 will swing headlamp 14 to operative position. Rotation of shaft 22 in clockwise direction will swing the headlamp to retracted position. It will be observed that links 18 and 20 are so designed that in the operative position of the headlamp the pivot between lever 20 and link 18 is beyond dead center and link 18 engages lamp pivot 16 which serves as a stop to limit its movement. This serves to resist any tendency of the lamp to swing toward retracted position as the result of jolting or pressure applied against the lamp.

30 indicates a cover for the opening 12. The cover is preferably flanged at its periphery as shown so as to cooperate with inturned flange 31 formed about the opening 12. Gasket 32 may be provided on the cover flange as shown to prevent the entrance of dirt or moisture. Cover 30 is provided with ears 33 one of which has a slot 34 therein, as best shown in Figure 4, engaged over pivot 36 fixedly secured to any suitable support such as housing 17.

38 indicates a gear segment rotatably mounted on pivot 36. To gear segment 38 is rigidly secured plate 40 having cam slot 42 therein. To one of the ears 33 is secured roller equipped stud 44 received in the cam slot 42.

46 indicates a rack bar suitably guided for longitudinal movement in fixed guides 47. The rack bar carries teeth as shown meshing with the teeth of gear segment 38. To the rack bar 46 is pivoted a bell crank 48 having one end equipped with opposed lugs or teeth 50 and 52. Bell crank 48 is yieldingly urged in clockwise direction by torsion spring 56. In the advanced position of the headlamp, lug 52 is engaged with a notch 53 in sector 54 suitably fixed to housing 17, thereby holding rack bar 46 against longitudinal movement and cover 30 in retracted position.

In order to operate the cover from the shaft 22 there is fixed to the shaft a cam sector 28 having face 57 adapted to engage the lower arm 58 of bell crank 48 and provided with notch 60 adapted to receive lug 50 on the bell crank.

Figure 2:
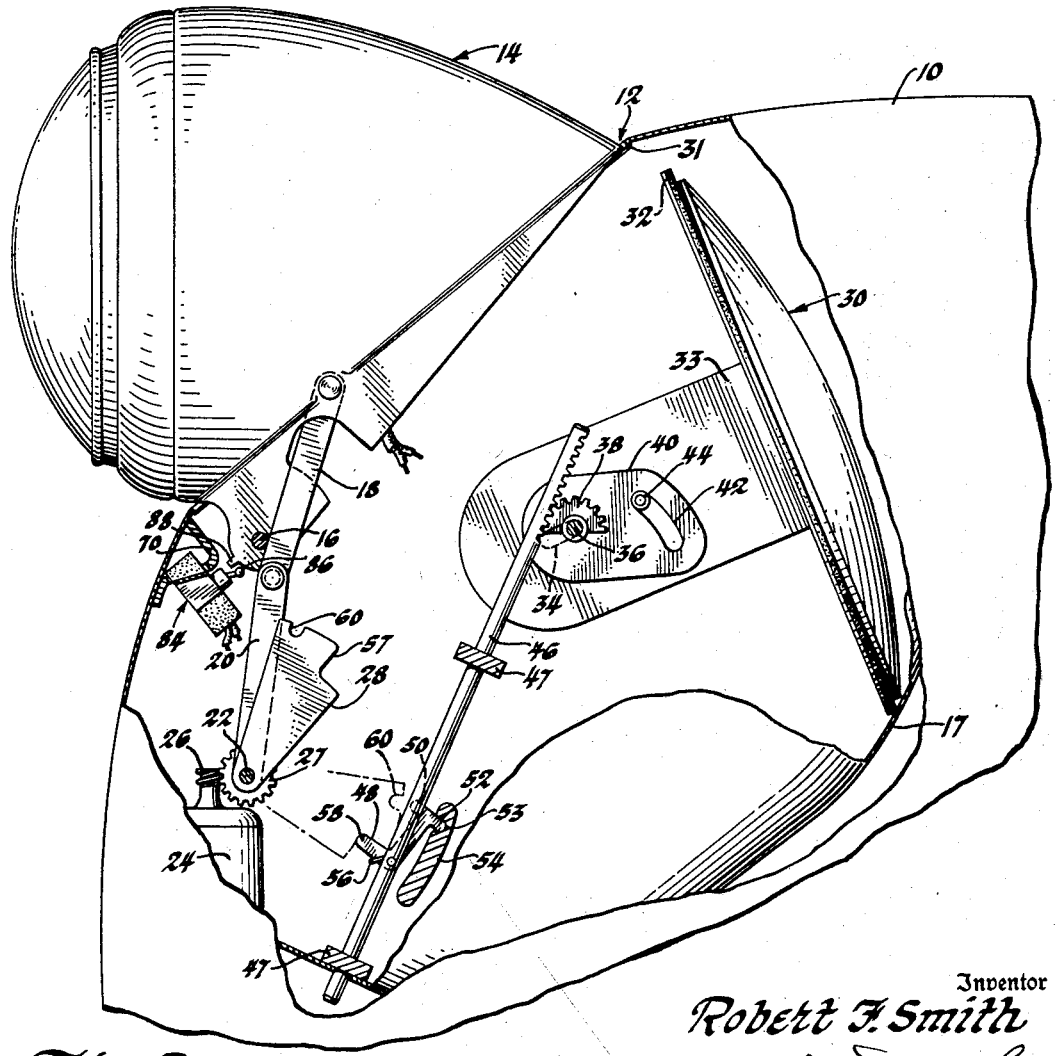
Figure 2 is an enlarged side elevation of the lamp and its mounting with parts broken away and parts in section to better show the construction.

The lamp advancing and retracting mechanism operates as follows: With the cover 30 in closed position and the headlamp retracted if it is desired to use the headlamps the electric motor 24 is operated to rotate shaft 22 in counterclockwise direction. Through lever 20 and link 18 the headlamp 14 is moved toward operative position but at the same time through engagement of notch 60 with lug 50 as shown in Figure 3 rack bar 46 is moved longitudinally thereby rotating gear segment 38 and plate 40 in clockwise direction. During the first part of the rotation of plate 40 the engagement of cam slot 42 with stud 44 causes the cover 30 to be drawn downwardly since the cover is confined for such movement by engagement of slot 34 by pivot 36. As soon as the cover is retracted, further movement of the rack bar and gear segment 38 causes the cover to be swung about pivot 36 to the fully retracted position shown in Figure 2. The parts are so proportioned that the cover is out of the way before the headlamp is moved into the opening in the fender.

The initial movement of the headlamp toward operative position causes bell crank 48 to be released by cam plate 28 so that spring 56 is effective to tend to swing the bell crank in clockwise direction so that lug 52 on the bell crank engages notch 53 in stationary sector 54 thus holding rack bar 46 in advanced position and cover 30 retracted. Further movement of shaft 22 in counterclockwise direction swings the lamp to fully projected position and thereupon the rotation of the shaft 22 is stopped as by opening of the motor circuit through lug 88 tripping knob 86 of limit switch 84. Switch 84 is of such design that the operation of it sets the circuit to reverse the operation upon the next actuation of dash switch S as will be described later.

When it is desired to retract the headlamps the motor 24 is rotated in reverse direction, rotating shaft 22 in clockwise direction and through its connection with link 18 swinging the lamp 14 into the recess in the fender. During this rotation, surface 57 on cam sector 28 engages arm 58 of bell crank 48 thereby withdrawing lug 52 from locking engagement with notch 53 in fixed sector 54, and shortly thereafter causing lug 50 to engage in notch 60 in cam sector 28, whereupon shaft 22 moves rack bar 46 downwardly thereby rotating gear segment 38, plate 40 and cover 30 until the cover reaches a position beneath the opening 12 where it engages a suitable stop 70. The latter part of the downward movement of the rack bar swings cam plate 40 in clockwise direction, forcing stud 44 and with it the cover 30 outwardly until the cover securely engages the opening 12 in the fender. At this stage in the rotation of shaft 22 lug 90 trips knob 86 of switch 84 thereby breaking the motor circuit and resetting it for operation in reverse direction.

In Figure 6 there is illustrated a suitable circuit for operating the lamp actuating mechanism. Referring to the figure, B indicates the battery and S the usual push-pull dash lighting switch provided with movable contactors 80 and 82 insulated from each other. Switch S is shown in the off position. The usual foot switch in series with switch S for raising or lowering the beam is not illustrated. Motor 24 is provided with reversely wound forward and reverse fields as shown. 84 indicates a double pole double-throw switch, preferably of the toggle type adapted in full line position to supply current to the armature and forward field and in the dotted line position to supply current to the armature and reverse field to give forward or reverse movement to the motor as desired. Switch 84 is operated by knob 86 which is actuated by lugs 88 and 90 as previously described.

Figure 6 shows the switches S and 84 in the position they occupy with the lamp out and retracted. If now switch S is moved to the dotted line position shown at the extreme right current is supplied to the headlamp 14 and also through lead 92 and switch 84 to the armature and forward field of motor 24 causing the headlamp to be moved to advanced position. Upon reaching this position lug 88 trips switch 84 breaking both the armature and field circuits of motor 24 and moving the switch to the position indicated by dotted lines in Figure 6. Switch 84 is now in position so that moving switch S in toward parking or off position not only breaks the circuit to headlamp 14 but also closes a circuit through lead 94 and the armature and reverse field of motor 24 causing the motor to rotate in reverse direction and retract the headlamp 14. When the headlamp reaches retracted position lug 90 trips switch 84 moving it to full line position shown in Figure 6 ready to repeat the cycle. It will be understood, of course, that the circuit connections must be duplicated in obvious manner to actuate both headlamps.

With this arrangement it will be apparent that the headlamp may be projected or retracted as desired and when retracted the opening in the fender or other body part is closed and sealed by a panel protecting the lamp and shaped to conform to the appearance of the rest of the body. The lamp is preferably of such design that when projected its lines blend with the contour of the body. Consequently, in either position of the parts the vehicle presents an attractive appearance. The parts are securely held against rattling under all conditions.

It will be understood that while but one set of links 18 and 20 has been illustrated, this set is duplicated at the opposite side of the lamp. Similarly the shutter operating mechanism consisting of sector 28, rack 46, gear segment 38, plate 40 and the cooperating parts may be duplicated on the other side of the lamp to reduce the strain on the parts and prevent binding. As the duplicated mechanisms operate in precisely the same way it is believed to be unnecessary to repeat the description.

I claim:

1. A retractable lamp mounting for vehicles for enabling the lamp to be exposed when desired in an opening in a suitable support comprising means for movably mounting the lamp at the rear of said opening so as to enable it to be positioned in sealing engagement with said opening or withdrawn rearwardly therefrom, a closure for said opening, means for movably mounting said closure at the rear of said opening so as to enable it to be positioned in sealing engagement with said opening or withdrawn rearwardly therefrom, means operative when said closure is withdrawn from said opening for moving said closure out of the path of movement of said lamp, and means for shifting said lamp and closure in sequence so as to permit said lamp to be withdrawn rearwardly from sealing engagement with said opening, and said closure to be thereafter moved in line with said opening and advanced into sealing engagement therewith or to permit said closure to be withdrawn rearwardly from said opening and thereafter moved out of line therewith while advancing the lamp into operative position in said opening.

2. A retractable lamp mounting for vehicles for enabling the lamp to be exposed when desired in an opening in a suitable support comprising means for movably mounting the lamp at the rear of said opening so as to enable it to be positioned in sealing engagement with said opening or withdrawn rearwardly therefrom, a closure for said opening, means for movably mounting said closure at the rear of said opening so as to enable it to be positioned in sealing engagement with said opening or withdrawn rearwardly therefrom, means operative when said closure is withdrawn from said opening for moving said closure out of the path of movement of said lamp, and means for shifting said lamp and closure in sequence so as to permit said lamp to be withdrawn rearwardly from sealing engagement with said opening, and said closure to be thereafter moved in line with said opening and advanced into sealing engagement therewith or to permit said closure to be withdrawn rearwardly from said opening and thereafter moved out of line therewith while advancing the lamp into operative position in said opening and an operator-controlled motor for actuating said shifting means, and means operated by said motor toward the end of each cycle for stopping the motor and resetting the motor control for reverse operation.

3. A retractable lamp mounting for vehicles for enabling the lamp to be exposed when desired in an opening in a suitable support comprising means for movably mounting the lamp at the rear of said opening so as to enable it to be positioned in sealing engagement with said opening or withdrawn rearwardly therefrom, a closure for said opening, means for movably mounting said closure at the rear of said opening so as to enable it to be positioned in sealing engagement with said opening or withdrawn rearwardly therefrom, means operative when said closure is withdrawn from said opening for moving said closure out of the path of movement of said lamp, and means for shifting said lamp and closure in sequence so as to permit said lamp to be withdrawn rearwardly from sealing engagement with said opening, and said closure to be thereafter moved in line with said opening and advanced into sealing engagement therewith or to permit said closure to be withdrawn rearwardly from said opening and thereafter moved out of line therewith while advancing the lamp into operative position in said opening, and means for locking said closure in fully retracted position and for unlocking said closure prior to advancing the closure toward operative position.

4. A retractable lamp mounting for vehicles for enabling the lamp to be exposed when desired in an opening in a suitable support comprising means for movably mounting the lamp so as to enable it to be operatively positioned in said opening or withdrawn rearwardly therefrom, an independently pivoted closure adapted to be swung over said opening or rearwardly of said opening, and operator controlled selective means operating in sequence to first withdraw said lamp from said opening, and then swing said closure over said opening or to first swing said closure rearwardly from said opening and then advance said lamp into said opening, and means for automatically locking said closure when in withdrawn position and for automatically unlocking said closure at the beginning of the closing cycle.

5. A retractable lamp mounting for vehicles for enabling a lamp to be exposed when desired in an opening in a suitable support comprising a lamp pivotally mounted adjacent said opening so as to be swingable into operative position in said opening or rearwardly thereof, a closure pivotally mounted at the rear of said opening and adapted to be moved into operative position covering said opening or to be moved rearwardly therefrom, operator-controlled means for swinging said lamp toward and from operative position, and means actuated by said operator-controlled means operative at the beginning of its lamp advancing movement for retracting said closure and operative toward the end of its lamp retracting movement for advancing said closure, said last-named means comprising a reciprocating member actuated by said operator-controlled means, a rotatable member operatively connected to said reciprocating member and a combined sliding and pivotal connection between said rotatable member and said closure to impart sliding movement to said closure toward the end of its advancing movement to press the shutter firmly against the opening to make a good seal.

6. A retractable lamp mounting for vehicles for enabling the lamp to be exposed when desired in an opening in a vehicle body, comprising means for movably mounting the lamp on the body so as to enable it to be operatively positioned in said opening or inoperatively positioned out of the way behind said opening and within the body contour, mechanism for moving the lamp on said mounting means to and form said positions, a closure for the opening, independent means for movably mounting the closure on the body so as to enable it to be operatively positioned to close said opening or inoperatively positioned behind said opening and within the body contour, mechanism for moving the closure on said mounting means to and from said positions, and operating means selectively controllable by the operator for operating said mechanisms in sequence to move said closure to said inoperative position and thereafter move the lamp to operative position in said opening or to move said lamp to said inoperative position and thereafter move the said closure to operative position closing said opening.

7. A retractable lamp mounting for vehicles for enabling the lamp to be exposed when desired in an opening in a vehicle body, comprising means for movably mounting the lamp on the body so as to enable it to be operatively positioned in said opening or inoperatively positioned out of the way behind said opening and within the body contour, a closure for the opening, independent means for movably mounting the closure on the body so as to enable it to be operatively positioned to close said opening or inoperatively positioned behind said opening and within the body contour, means for shifting said lamp and closure in sequence adapted to move said closure to said inoperative position and thereafter move the lamp to operative position in said opening or to move said lamp to said inoperative position and thereafter move the said closure to operative position closing said opening, an operator-controlled motor for actuating said shifting means, and means operated by said motor toward the end of each cycle for stopping the motor and resetting the motor control for reverse operation.

8. A retractable lamp mounting for vehicles for enabling the lamp to be exposed when desired in an opening in a vehicle body comprising means for movably mounting the lamp on the body to enable it to be operatively positioned in sealing engagement with said opening or inoperatively positioned out of the way behind said opening and within the body contour, mechanism for moving the lamp on said mounting means to and from said positions, a closure, independent means for movably mounting the closure on the body to enable it to be operatively positioned over said opening and in sealing engagement therewith or inoperatively positioned behind said opening and within the body contour, mechanism for moving the closure on said mounting means to and from said positions, and operating means selectively controllable by the operator for operating said mechanisms in sequence to move said closure into inoperative position and thereafter move the lamp into sealing engagement with said opening or to move said lamp to inoperative position and thereafter move said closure into sealing engagement with said opening.

9. A retractable lamp mounting for vehicles for enabling the lamp to be exposed when desired in an opening in a vehicle body comprising means for movably mounting the lamp on the body so as to enable it to be operatively positioned in said opening or withdrawn behind said opening and within the body contour, mechanism for moving the lamp on said mounting means to and from said positions, an independently pivoted closure adapted to be swung over said opening to close the same or to be swung behind the same within the body contour, mechanism for swinging said closure to and from closed position, and operating means selectively controllable by the operator for operating said mechanisms in sequence to first withdraw said lamp from said opening to said position behind said opening within the body contour and then swing said closure over said opening or to first swing said closure to said position behind said opening within the body contour and then advance said lamp into said opening.

10. In the combination as claimed in claim 1, said means for movably mounting the lamp at the rear of said opening consisting of a pivotal connection.

11. A support having an opening therein, a lamp movably mounted on the support so as to permit it to be exposed at said opening or retracted behind said support, a cover pivotally and slidably mounted on said support to enable it to be exposed at said opening or retracted behind said support, a rotatable operating shaft, means connecting said shaft and lamp so as to swing the lamp toward said opening upon rotation of said shaft in one direction and away from said opening upon rotation of the shaft in the other direction, and means, including a cam, operated by said shaft adapted upon rotation of the shaft in the first direction to slide said cover away from said opening and thereafter swing it out of the path of movement of said lamp, and upon rotation of the shaft in the opposite direction to swing said cover over said opening after the lamp has been withdrawn therefrom and thereafter slide it into position in said opening.

ROBERT F. SMITH.